United States Patent
Lee et al.

(10) Patent No.: US 8,989,770 B2
(45) Date of Patent: Mar. 24, 2015

(54) METHOD AND APPARATUS FOR ESTIMATING DISPLACEMENT OF A USER TERMINAL

(75) Inventors: Jae-Myeon Lee, Gyeonggi-do (KR); Yung-Keun Jung, Gyeonggi-do (KR); Hyun-Su Hong, Gyeonggi-do (KR); Sun-Young Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 454 days.

(21) Appl. No.: 13/303,997

(22) Filed: Nov. 23, 2011

(65) Prior Publication Data

US 2012/0135750 A1 May 31, 2012

(30) Foreign Application Priority Data

Nov. 25, 2010 (KR) ........................ 10-2010-0118367

(51) Int. Cl.
| | |
|---|---|
| *H04W 24/00* | (2009.01) |
| *G01S 19/49* | (2010.01) |
| *G01C 21/16* | (2006.01) |
| *G01C 21/20* | (2006.01) |
| *G01C 22/00* | (2006.01) |
| *G01S 19/48* | (2010.01) |
| *H04W 64/00* | (2009.01) |

(52) U.S. Cl.
CPC ............... *G01S 19/49* (2013.01); *G01C 21/165* (2013.01); *G01C 21/206* (2013.01); *G01C 22/006* (2013.01); *G01S 19/48* (2013.01); *H04M 2250/12* (2013.01); *H04W 64/006* (2013.01)
USPC ..................................... 455/456.1; 455/456.3

(58) Field of Classification Search
USPC ................. 455/456.1–456.6, 575.9
See application file for complete search history.

(56) References Cited

U.S. PATENT DOCUMENTS

| | | | | |
|---|---|---|---|---|
| 7,499,797 | B2 * | 3/2009 | Mok ............................. | 701/434 |
| 2005/0270236 | A1 * | 12/2005 | Krumm et al. ............... | 342/451 |
| 2010/0191501 | A1 * | 7/2010 | Kitamura et al. ............ | 702/150 |
| 2010/0304754 | A1 * | 12/2010 | Czompo et al. ............ | 455/456.1 |
| 2011/0071971 | A1 * | 3/2011 | Parks et al. ..................... | 706/45 |

* cited by examiner

*Primary Examiner* — Brandon Miller
(74) *Attorney, Agent, or Firm* — The Farrell Law Firm, P.C.

(57) ABSTRACT

An apparatus and method for estimating displacement of a user terminal are provided. The method includes estimating, by the user terminal, a moving state of the user terminal; determining a first moving direction probability index of a user, based on the estimated moving state of the user terminal; and determining a moving state of the user terminal and estimating a moving direction of the user terminal, based on the first moving direction probability index.

20 Claims, 7 Drawing Sheets

METHOD AND APPARATUS FOR ESTIMATING DISPLACEMENT OF A USER TERMINAL

PRIORITY

This application claims priority under 35 U.S.C. §119(a) to Korean Patent Application Serial No. 10-2010-0118367, which was filed in the Korean Intellectual Property Office on Nov. 25, 2010, the entire disclosure of which is hereby incorporated by reference.

BACKGROUND OF THE INVENTION

1. Field of the Invention

The present invention relates generally to navigation technology, and more particularly, to a method and apparatus for obtaining location information in a Global Positioning System (GPS) shadow area.

2. Description of the Related Art

A personal navigation system is often included in mobile terminals such as mobile phones, smart phones, Personal Digital Assistants (PDAs), and MP3 players, enabling user-centered route guidance. Basically, the personal navigation system identifies the location of a user and guiding the user to a desired destination.

Commonly, a personal navigation device includes a GPS receiver, an acceleration sensor, an angular speed sensor, etc., in a mobile terminal (or a user terminal). The personal navigation system provides a navigation service by estimating a user's stride and generating a navigation solution based on the estimated stride. Therefore, in order to provide an accurate navigation service, the personal navigation system should accurately determine a user's stride and moving speed.

Conventional personal navigation systems estimate a user's stride and moving speed without considering of the location on the user's body in which the user carries the mobile terminal. Consequently, the estimation of a user's stride and moving speed may undergo considerable error depending on where on the user's body the user carries the mobile terminal, deteriorating the navigation service. Therefore, in order for a conventional personal navigation system to accurately estimate a user's stride and moving speed, it must first obtain information about where on the user's body the mobile terminal is being carried. Further, even after obtaining the information, the user must continually carry the mobile terminal in the same area, in order for the conventional personal navigation system to accurately estimate the user's stride and moving speed.

SUMMARY OF THE INVENTION

Accordingly, the present invention is designed to address at least the problems and/or disadvantages described above and to provide at least the advantages described below.

An aspect of the present invention is to provide a method and apparatus capable of accurately estimating a user's stride and moving speed regardless where on the user's body the user carries the terminal.

Another aspect of the present invention is to provide a method and apparatus capable of accurately estimating a moving direction of a user terminal being swung by a user's arm.

In accordance with an aspect of the present invention, a method for estimating displacement of a user terminal is provided. The method includes estimating, by the user terminal, a moving state of the user terminal; determining a first moving direction probability index of a user, based on the estimated moving state of the user terminal; and determining a moving state of the user terminal and estimating a moving direction of the user terminal, based on the first moving direction probability index.

In accordance with another aspect of the present invention, an apparatus for estimating displacement of a user terminal is provided. The apparatus includes a motion sensor that generates motion information representing a motion of the user terminal; a location information estimator that estimates a moving state of the user terminal being moved by a user, based on the motion information provided from the motion sensor, determines a first moving direction probability index of the user, based on the estimated moving state of the user terminal, estimates location information including a user's moving direction, based on the first moving direction probability index of the user, and determines the moving state of the user terminal, based on the first moving direction probability index of the user.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will be described in detail below with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In the present invention, the term "GPS location information" refers to information representing a location of a mobile terminal (or a user terminal), estimated based on data provided from a GPS system, and the term "location information" refers to location information of a mobile terminal, estimated based on information provided from an acceleration sensor and a geomagnetic sensor. In addition, the term "indoor location information" refers to information representing a location of a mobile terminal, which is determined by a Wireless Fidelity (Wi-Fi) Positioning System (WPS) module, by a cell-based location information module that provides cell-based location information of a mobile communication network, and by a sensor-based location information module that provides location information of a mobile terminal using Bluetooth®, ZigBee®, an Infrared Data Association (IrDA) sensor, an ultrasonic sensor, a Radio Frequency Identification (RFID) sensor, etc.

Figure 1:
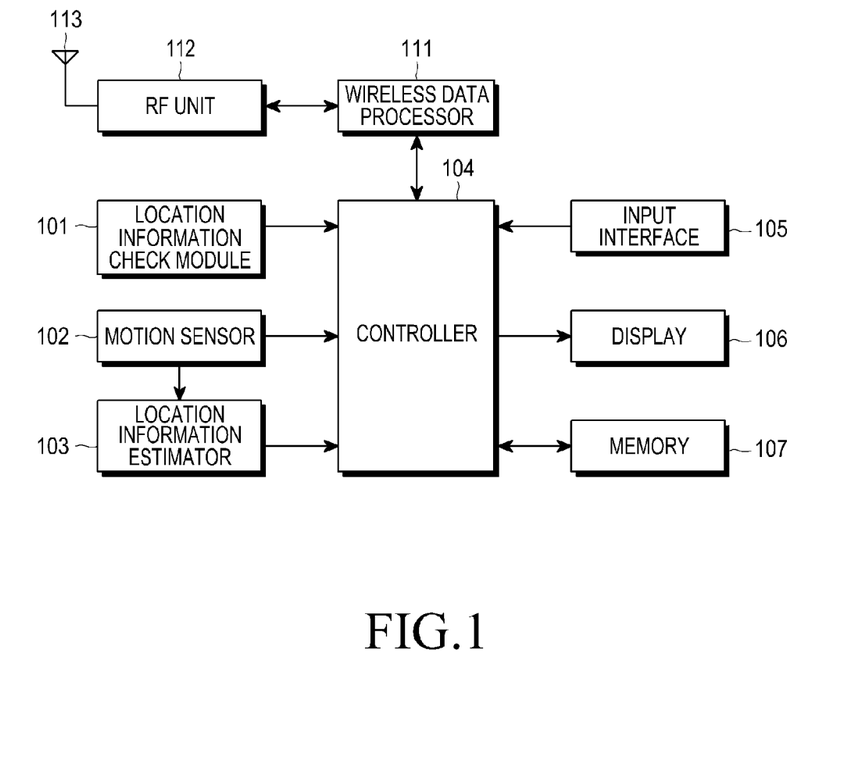
FIG. 1 is block diagram illustrating a mobile terminal including an apparatus for estimating displacement of the mobile terminal according to an embodiment of the present invention.

FIG. 1 is a block diagram illustrating a mobile terminal including an apparatus for estimating displacement of the mobile terminal according to an embodiment of the present invention.

Among the various devices that may include a proposed apparatus for providing location information, a mobile terminal will be considered herein as an example of a hardware device to which the present invention is applicable. Further, although a proposed apparatus for estimating displacement of a mobile terminal is mounted in the mobile terminal in accordance with an embodiment of the present invention, it will be understood by those of ordinary skill in the art that the proposed apparatus for estimating displacement of a mobile terminal may be applied to various other devices, other than a mobile terminal, for providing location information.

Referring to FIG. 1, a mobile terminal including an apparatus for estimating displacement of the mobile terminal includes a location information check module 101, a motion sensor 102, a location information estimator 103, a controller 104, an input interface 105, a display 106, a memory 107, a wireless data processor 111, and a Radio Frequency (RF) unit 112.

The location information check module 101 includes a GPS module for receiving location information from the GPS, and may include a WPS module that checks location information based on the information received from a wireless Access Point (AP) over Wi-Fi, a cell-based location information module that provides cell-based location information of a mobile communication network, and a sensor-based location information module that provides location information of the mobile terminal using Bluetooth®, ZigBee®, an IrDA sensor, a ultrasonic sensor, an RFID sensor, etc.

The motion sensor 102 detects location information in a shadow area and information for estimating accuracy of the location information. For example, the motion sensor 102 may include an acceleration sensor for detecting acceleration information of the mobile terminal to detect a moving speed of the mobile terminal, a geomagnetic sensor for detecting azimuth information for estimating a moving direction of the user, an altimeter sensor for detecting altitude information of the user, and a gyro sensor for detecting angular speed information.

The location information estimator 103 determines moving information of the mobile terminal, which includes a moving speed and a moving direction of the mobile terminal, based on the information provided from the acceleration sensor and the geomagnetic sensor in the motion sensor 102, in an area where the location information check module 101 has failed to detect the location information of the user (e.g., a GPS shadow area). Specifically, the location information estimator 103 determines a moving state of the mobile terminal and calculates a moving speed of the user, based on the information from the acceleration sensor, and acquires azimuth information and validation information of geomagnetic sensor data based on the information from the geomagnetic sensor. The location information estimator 103 estimates the user's current location information by reflecting the azimuth information and moving speed information for the estimated user's moving direction, in the GPS location information stored in the memory 107.

The user may move with the mobile terminal in a pants pocket, in a coat pocket, while viewing the display of the mobile terminal, on the waist, or in a handbag. In this case, as the user's moving direction is equal to the moving direction of the mobile terminal, the location information estimator 103 may determine the movement of the mobile terminal based on the motion sensor value provided from the motion sensor 102.

However, if the user moves with the mobile terminal grasped in hand, while the user's arms swing back and forth, the moving direction of the mobile terminal varies according to the swing of the user's arm, causing an error in determining the moving direction of the mobile terminal.

In accordance with an embodiment of the present invention, an algorithm is provided, which determines whether the user moves with the mobile terminal grasped in hand, with the user's arms waving back and forth, and if so, accurately determines the moving direction of the mobile terminal. For example, the location information estimator 103 performs an algorithm for determining whether the user moves with the mobile terminal grasped in hand, with the user's arms waving back and forth, and if so, accurately determines the moving direction of the mobile terminal.

The controller 104 controls the overall operation of the mobile terminal by collectively controlling operations of the components of the mobile terminal. Basically, the controller 104 performs a process corresponding to the number and menu selection signal input through the input interface 105, processes the location information provided from the location information check module 101, and outputs the processed information on the display 106 along with the map stored in the memory 107.

The controller 104 receives information about the sensitivity of location information provided from the GPS module in the location information check module 101, e.g., information about the number of available GPS satellites and received strength values, and determines whether the mobile terminal is located in a shadow area by checking the sensitivity of the location information. If it is determined that the mobile terminal is located in the shadow area, the controller 104 activates the motion sensor 102 and the location information estimator 103.

The input interface 105 is a device for receiving input, e.g., commands, phone numbers, and characters, from the user. The input interface 105 may be implemented by a keypad, or may be implemented by a touch screen-based key input interface that displays keys on a display overlapping the touch screen and receives keys corresponding to the areas touched by the user.

The display 106, e.g., a display panel such as Liquid Crystal Display (LCD), displays data (e.g., location information and map data) generated by running applications, including the messages associated with various operations of the mobile terminal, under control of the controller 104.

The memory 107 stores data (e.g., map data). In particular, the memory 107 stores location information provided from the location information check module 101, data provided from the motion sensor 102, and location information provided from the location information estimator 103.

The RF unit 112 modulates a user's voice, character, and control data into radio signals, and transmits the radio signals to a base station (not shown) of the mobile communication network via an antenna 113. The RF unit 112 receives radio signals from the base station via the antenna 113, and demodulates the radio signals into voice, character, and control data.

The wireless data processor 111, under control of the controller 104, decodes voice data received from the RF unit 112, and outputs the decoded voice data in audible sound through a speaker. The wireless data processor 111 converts a user's voice signals picked up by a microphone into audio data, and outputs the audio data to the RF unit 112. The wireless data processor 111 provides the characters and control data received from the RF unit 112 to the controller 104.

Figure 2A:
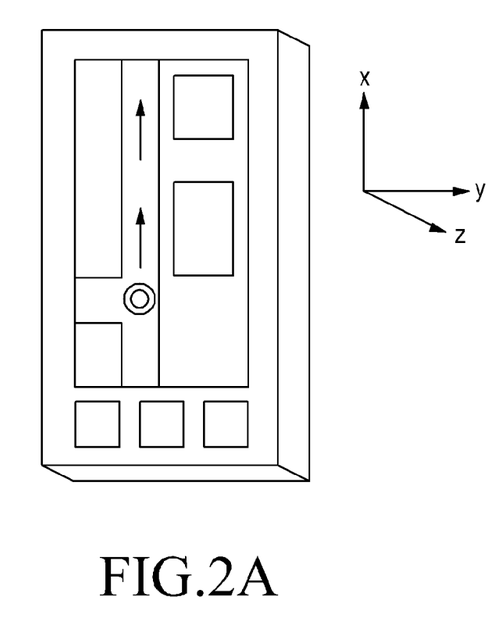
FIG. 2A illustrates a mobile terminal including an apparatus for estimating displacement of the mobile terminal according to an embodiment of the present invention.

FIG. 2A illustrates a mobile terminal including an apparatus for estimating displacement of the mobile terminal according to an embodiment of the present invention.

Referring to FIG. 2A, a longitudinal axis of the mobile terminal is defined as an x-axis, a transverse axis of the mobile terminal, which is perpendicular to the x-axis, is defined as a y-axis, and an axis along the direction (i.e., a direction facing the rear of the mobile terminal) being perpendicular to a plane formed by the x-axis and the y-axis, is defined as a z-axis.

Figure 2B:
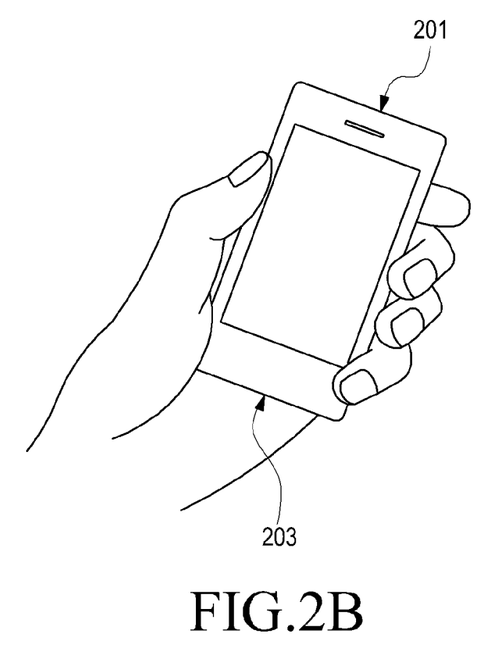
FIG. 2B a mobile terminal including an apparatus for estimating displacement of the mobile terminal in a user's hand, according to an embodiment of the present invention.

FIG. 2B a mobile terminal including an apparatus for estimating displacement of the mobile terminal in a user's hand, according to an embodiment of the present invention.

Referring to FIG. 2B, when a user moves carrying the mobile terminal in hand, viewing a display thereof, a portion corresponding to a moving direction of the user is defined as an upper portion 201, while its opposite portion is defined as a lower portion 203.

Figure 2C:
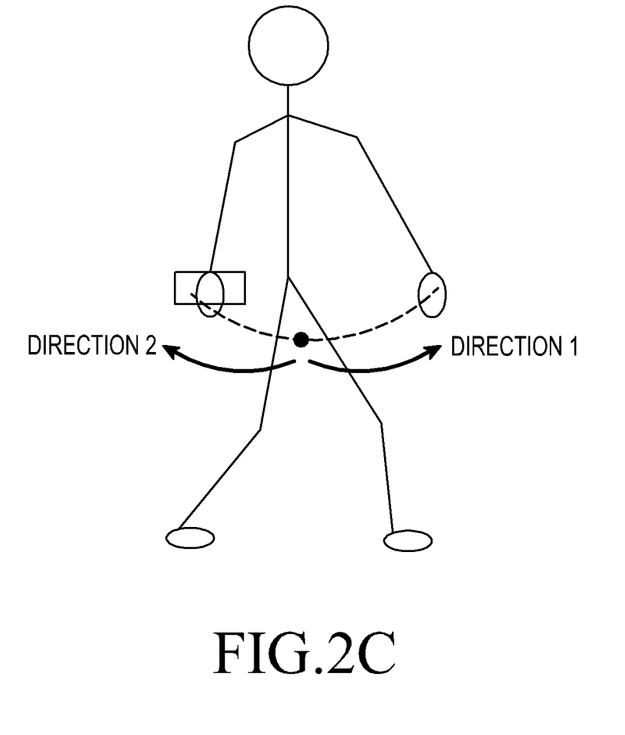
FIG. 2C illustrates a user moving with a mobile terminal including an apparatus for estimating displacement of the mobile terminal in the user's hand, according to an embodiment of the present invention.

FIG. 2C illustrates a user moving with a mobile terminal including an apparatus for estimating displacement of the mobile terminal in the user's hand, with the user's arms waving back and forth, according to an embodiment of the present invention.

Referring to FIG. 2C, when the user moves with the mobile terminal grasped in hand, with the user's arms waving back and forth, the mobile terminal is repeatedly swung in first and second directions (Direction 1 and Direction 2). Therefore, based on averages of x, y, and z-axis accelerations provided from the motion sensor 102, the location information estimator 103 determines whether the user moves holding the mobile terminal with the upper portion 201 facing the moving direction, or moves holding the mobile terminal with the lower portion 203 facing the moving direction. For example, if a result obtained by subtracting an x-axis average from a z-axis average is greater than or equal to a predetermined first threshold, the location information estimator 103 sets a first moving direction probability index as a predetermined first value, determining that the user moves holding the mobile terminal with the upper portion 201 facing the moving direction. However, if the result obtained by subtracting the x-axis average from the z-axis average is less than the first threshold, the location information estimator 103 sets the first moving direction probability index as a predetermined second value, determining that the user moves holding the mobile terminal with the lower portion 203 facing the moving direction.

In addition, based on averages of the x, y, and z-axis accelerations provided from the motion sensor 102, the location information estimator 103 determines whether the user moves holding the mobile terminal with the display facing the user, or moves holding the mobile terminal with the display facing the opposite direction of the user. For example, if a result obtained by subtracting a z-axis average from a y-axis average is greater than or equal to a predetermined second threshold, the location information estimator 103 sets the first moving direction probability index as a predetermined third value, determining that the user moves holding the mobile terminal with the display facing the user. However, if the result obtained by subtracting the z-axis average from the y-axis average is less than the second threshold, the location information estimator 103 sets the first moving direction probability index as a predetermined fourth value, determining that the user moves holding the mobile terminal with the display facing the opposite direction of the user, i.e., facing away from the user.

The predetermined first to fourth values set as the first moving direction probability index may be set in various ways by statistics of the values (e.g., output values of an acceleration sensor) provided from the motion sensor 102.

The location information estimator 103 may determine a moving direction of the user based on a gyro sensor value provided from the motion sensor 102.

Figure 2D:
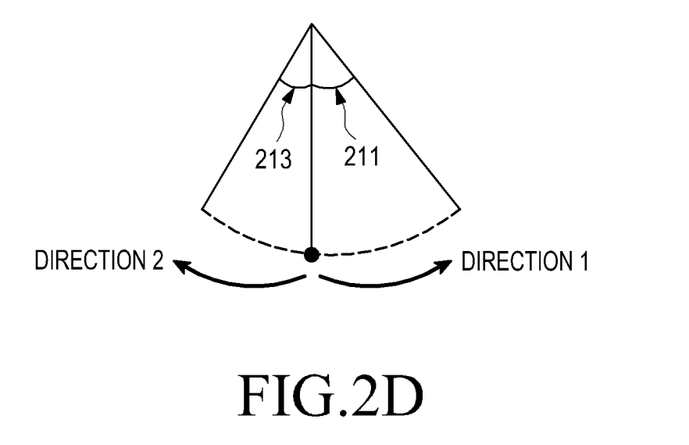
FIG. 2D illustrates a moving state of a mobile terminal including an apparatus for estimating displacement of the mobile terminal in a user's hand, according to an embodiment of the present invention.

FIG. 2D illustrates a moving state of a mobile terminal including an apparatus for estimating displacement of the mobile terminal in a user's hand, according to an embodiment of the present invention.

Referring to FIG. 2D, a rotation angle 211 given when the mobile terminal being swung by the user's arm moves in the first direction corresponding to the user's moving direction starting from the lowest point of the mobile terminal, is greater than a rotation angle 213 given when the mobile terminal moves in the second direction corresponding to the opposite direction of the user's moving direction starting from the lowest point. Therefore, the location information estimator 103 may determine a second moving direction probability index, determining the direction having a greater rotation angle as a user's moving direction. The second moving direction probability index may be determined based on a difference between a rotation angle during movement in the first direction and a rotation angle during movement in the second direction, and may be determined using, for example, Equation (1) below.

$$\beta = \text{Coeff} \times (\Delta\theta_a - \Delta\theta_b) \qquad (1)$$

In Equation (1), $\beta$ represents the second moving direction probability index, Coeff represents a predetermined coefficient, $\Delta\theta_a$ represents the rotation angle 211 during movement in the first direction, and Mb represents the rotation angle 213 during movement in the second direction.

Similarly, an angular acceleration given when the mobile terminal being swung by the user's arm rotates in the first direction corresponding to the user's moving direction starting from the lowest point of the mobile terminal, is greater than an angular acceleration given when the mobile terminal rotates in the second direction corresponding to the opposite direction of the user's moving direction starting from the lowest point. Therefore, the location information estimator 103 may determine a third moving direction probability index, determining the direction having a greater angular acceleration as a user's moving direction.

The third moving direction probability index may be determined based on a difference between an angular acceleration during swing in the first direction and an angular acceleration during swing in the second direction, and may be determined using, for example, Equation (2) below.

$$\gamma = \text{Coeff} \times (\omega_a - \omega_b) \quad (2)$$

In Equation (2), $\gamma$ represents the third moving direction probability index, Coeff represents a predetermined coefficient, $\omega_a$ represents an angular acceleration during swing in the first direction, and cob represents an angular acceleration during swing in the second direction.

Generally, the mobile terminal passes its lowest point after the user's feet have touched the ground. Therefore, the location information estimator 103 may determine the time at which the user's feet touch the ground, based on the value provided from the motion sensor 102, and may determine a moving direction of the mobile terminal based on the angular speed given after the mobile terminal passed its lowest point after the time at which the user's feet have touched the ground, and then determine a fourth moving direction probability index. For example, the fourth moving direction probability index may be determined using Equation (3) below.

$$\lambda = (\text{Coeff} \times 1.0) \text{ or } 0 \quad (3)$$

In Equation (3), $\lambda$ represents the fourth moving direction probability index, and Coeff represents a predetermined coefficient.

Generally, while viewing the display of the mobile terminal, holding the mobile terminal in hand, the user may walk with the arm lowered down. Therefore, while the user holds the mobile terminal in hand, it is likely that the upper portion 201 of the mobile terminal is placed in the opposite direction of the gravity direction. Thus, considering the state where the user holds the mobile terminal in hand, the location information estimator 103 may determine a fifth moving direction probability index, which may be determined using, for example, Equation (4) below.

$$\phi = (\text{Coeff} \times 1.0) \text{ or } 0 \quad (4)$$

In Equation (4), $\phi$ represents the fifth moving direction probability index, and Coeff represents a predetermined coefficient.

In addition, the location information estimator 103 sums the first to fifth moving direction probability indexes and compares the sum with a predetermined threshold. If the summed moving direction probability index is greater than the threshold, the location information estimator 103 determines that the upper portion 201 of the mobile terminal is placed in the user's moving direction. Otherwise, if the summed moving direction probability index is less than or equal to the threshold, the location information estimator 103 determines that the upper portion 201 of the mobile terminal is placed in the opposite direction of the user's moving direction, i.e., that the lower portion 203 of the mobile terminal is placed in the user's moving direction.

Figure 3:
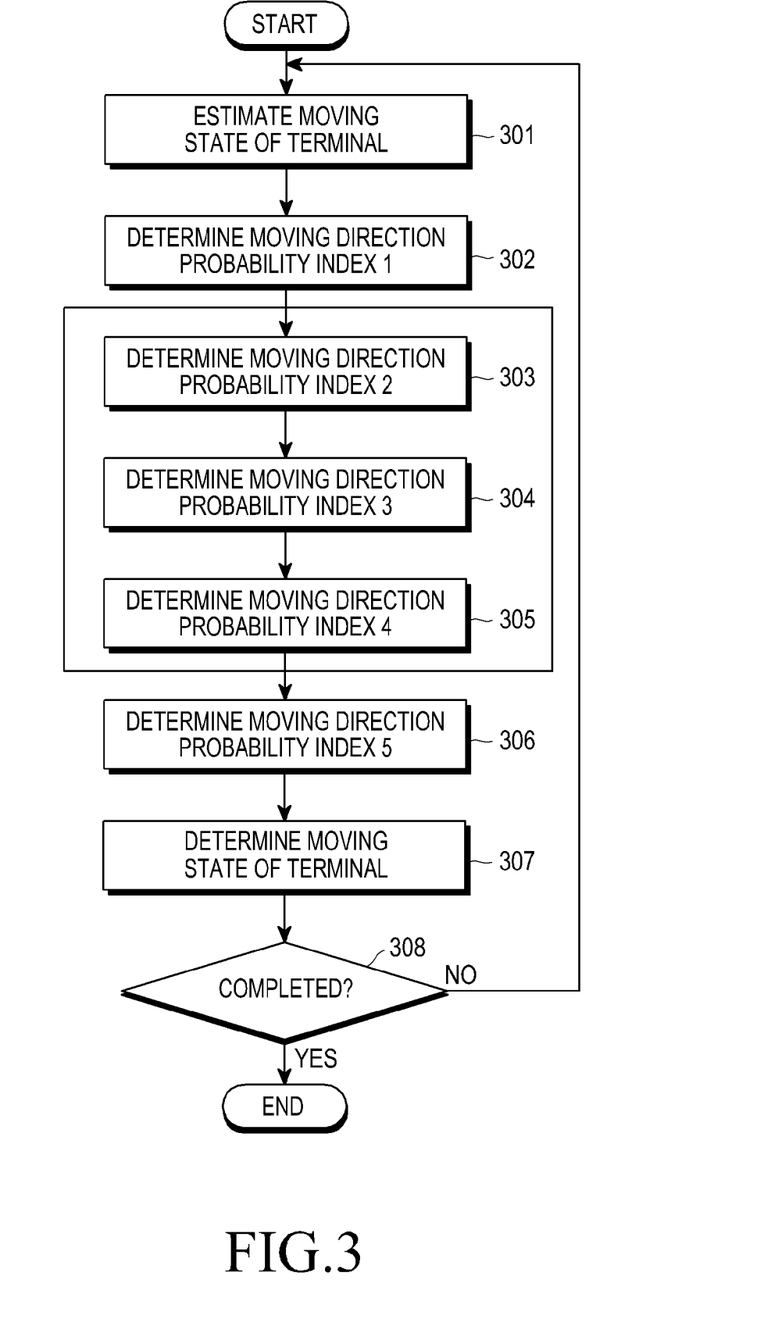
FIG. 3 is a flow chart illustrating a method for estimating displacement of a mobile terminal according to an embodiment of the present invention.

FIG. 3 is flowchart illustrating a method for estimating displacement of a mobile terminal according to an embodiment of the present invention.

Referring to FIG. 3, the location information estimator 103 determines a moving state of the mobile terminal in step 301. Specifically, the location information estimator 103 determines whether the upper portion 201 of the mobile terminal faces the moving direction of the user, or the lower portion 203 of the mobile terminal faces the moving direction of the user. In addition, the location information estimator 103 determines whether the display of the mobile terminal faces the user, or faces the opposite direction of the user.

More specifically, in step 301, based on averages of x, y, and z-axis accelerations provided from the motion sensor 102, the location information estimator 103 determines whether the user moves holding the mobile terminal with the upper portion 201 facing the moving direction, or moves holding the mobile terminal with the lower portion 203 facing the moving direction. For example, if a result obtained by subtracting an x-axis average from a z-axis average is greater than or equal to a predetermined first threshold, the location information estimator 103 determines that the user moves holding the mobile terminal with the upper portion 201 facing the moving direction. However, if the result obtained by subtracting the x-axis average from the z-axis average is less than the first threshold, the location information estimator 103 determines that the user moves holding the mobile terminal with the lower portion 203 facing the moving direction.

Further, in step 301, based on averages of x, y, and z-axis accelerations provided from the motion sensor 102, the location information estimator 103 determines whether the user moves holding the mobile terminal with the display facing the user, or moves holding the mobile terminal with the display facing the opposite direction of the user. For example, if a result obtained by subtracting a z-axis average from a y-axis average is greater than or equal to a predetermined second threshold, the location information estimator 103 determines that the user moves holding the mobile terminal with the display facing the user. However, if the result obtained by subtracting the z-axis average from the y-axis average is less than the second threshold, the location information estimator 103 determines that the user moves holding the mobile terminal with the display facing the opposite direction of the user.

In step 302, the location information estimator 103 sets a first moving direction probability index as a predetermined value according to the moving state of the mobile terminal determined in step 301.

In step 303, e.g., based on a gyro sensor value, the location information estimator 103 determines the direction having a greater rotation angle on the basis of the lowest point as a user's moving direction, and determines a second moving direction probability index.

In step 304, based on the gyro sensor value, the location information estimator 103 determines the direction having a greater angular acceleration on the basis of the lowest point as a user's moving direction, and determines a third moving direction probability index.

In step 305, using the value determined by the motion sensor 102, the location information estimator 103 determines a fourth moving direction probability index based on the time at which the user's feet touch the ground, and the direction where the mobile terminal passes its lowest point after the user's feet have touched the ground.

In step 306, the location information estimator 103 determines a fifth moving direction probability index, considering the state where the user views the display of the mobile terminal, holding the mobile terminal in hand.

In step 307, the location information estimator 103 sums the first to fifth moving direction probability indexes and compares the sum with a predetermined threshold. If the summed moving direction probability index is greater than the threshold, the location information estimator 103 determines that the upper portion 201 of the mobile terminal is placed in the user's moving direction. Otherwise, if the summed moving direction probability index is less than or equal to the threshold, the location information estimator 103 determines that the upper portion 201 of the mobile terminal is placed in the opposite direction of the user's moving direction. Based on the determined moving direction of the mobile terminal, the location information estimator 103 estimates the user's moving speed and moving direction.

In step 308, the location information estimator 103 repeats steps 301 to 307 until the process of determining the moving state of the mobile terminal is completed.

Although a process of determining the first to fifth moving direction probability indexes has been illustrated and described in steps 302 to 306, respectively, this is not intended to limit the present invention. For example, the location information estimator 103 may selectively determine at least one of the first to fifth moving direction probability indexes, or may determine at least two of the first to fifth moving direction probability indexes and combine them. Accordingly, in step 307, the location information estimator 103 may determine whether the upper portion 201 of the mobile terminal is placed in the user's moving direction by comparing the selectively determined at least one moving direction probability index with a predetermined threshold. Alternatively, the location information estimator 103 may determine whether the upper portion 201 of the mobile terminal is placed in the user's moving direction by summing of the at least two moving direction probability indexes and comparing the sum with a predetermined threshold.

Figure 4:
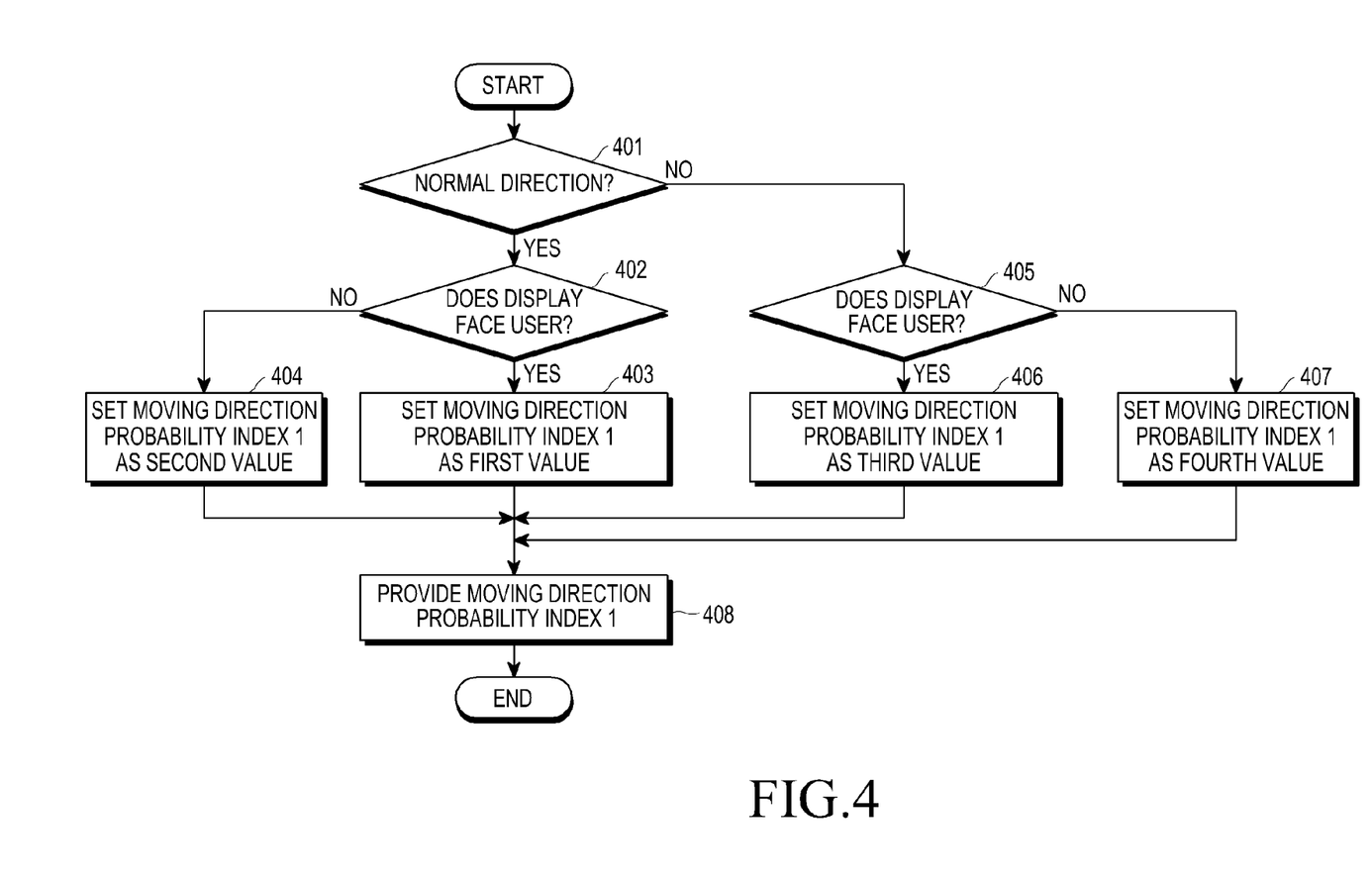
FIG. 4 is a flow chart illustrating a method for determining a first moving direction probability index of a mobile terminal according to an embodiment of the present invention.

FIG. 4 is a flow chart illustrating a method for determining a first moving direction probability index of a mobile terminal according to an embodiment of the present invention. For example, FIG. 4 illustrates a detailed process performed in step 302 of FIG. 3.

Referring to FIG. 4, in step 401, the location information estimator 103 determines whether the direction of the mobile terminal determined in step 301 is a normal direction, i.e., whether the upper portion 201 of the mobile terminal faces the user's moving direction. If the direction of the mobile terminal is the normal direction (Yes in step 401), the location information estimator 103.

determines whether the display of the mobile terminal faces the user in step 402. If the display of the mobile terminal faces the user (Yes in step 402), the location information estimator 103 sets the first moving direction probability index as a first value in step 403.

However, if the display of the mobile terminal does not face the user (No in step 402), the location information estimator 103 sets the first moving direction probability index as a second value different from the first value in step 404.

If the direction of the mobile terminal is not a normal direction (No in step 401), in step 405, the location information estimator 103 determines whether the display of the mobile terminal faces the user. If the display of the mobile terminal faces the user (Yes in step 405), the location information estimator 103 sets the first moving direction probability index as a third value different from the second value in step 406. However, if the display of the mobile terminal does not face the user (No in step 405), the location information estimator 103 sets the first moving direction probability index as a fourth value different from the third value in step 407.

In step 408, the location information estimator 103 provides the first moving direction probability index set in one of steps 403, 404, 406, or 407.

Figure 5:
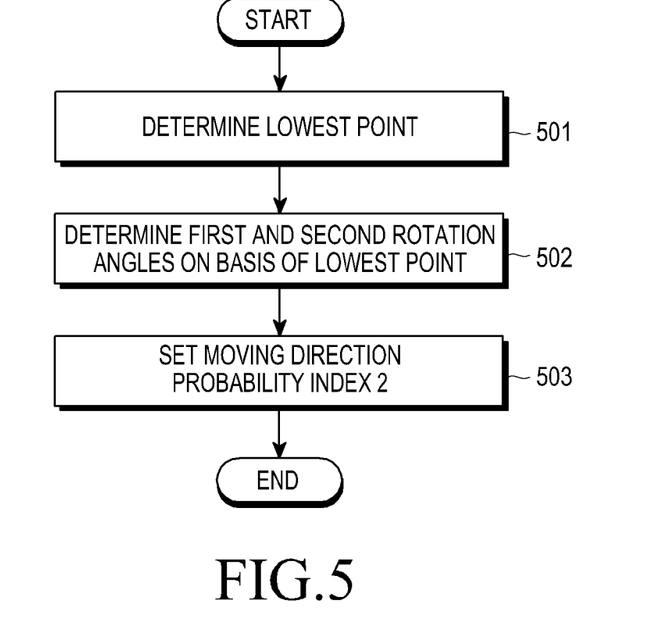
FIG. 5 is a flow chart illustrating a method for determining a second moving direction probability index of a mobile terminal according to an embodiment of the present invention.

FIG. 5 is a flow chart illustrating a method for determining a second moving direction probability index of a mobile terminal according to an embodiment of the present invention. For example, FIG. 5 illustrates a detailed process performed in step 303 of FIG. 3.

Referring to FIG. 5, the location information estimator 103 determines the lowest point of the mobile terminal being swung by the user's arm by determining the value (e.g., a gyro sensor value) provided from the motion sensor 102, in step 501.

A rotation angle 211 given when the mobile terminal being swung by the user's arm moves in the first direction corresponding to the user's moving direction starting from the lowest point of the mobile terminal, is greater than a rotation angle 213 given when the mobile terminal moves in the second direction corresponding to the opposite direction of the user's moving direction starting from the lowest point. Therefore, in step 502, the location information estimator 103 determines the rotation angle 211 during movement in the first direction and the rotation angle 213 during movement in the second direction.

In step 503, the location information estimator 103 determines the direction having a greater rotation angle as a user's moving direction, and sets the second moving direction probability index based on a difference between the rotation angle during movement in the first direction and the rotation angle during movement in the second direction. For example, the second moving direction probability index may be set using Equation (1) described above.

Figure 6:
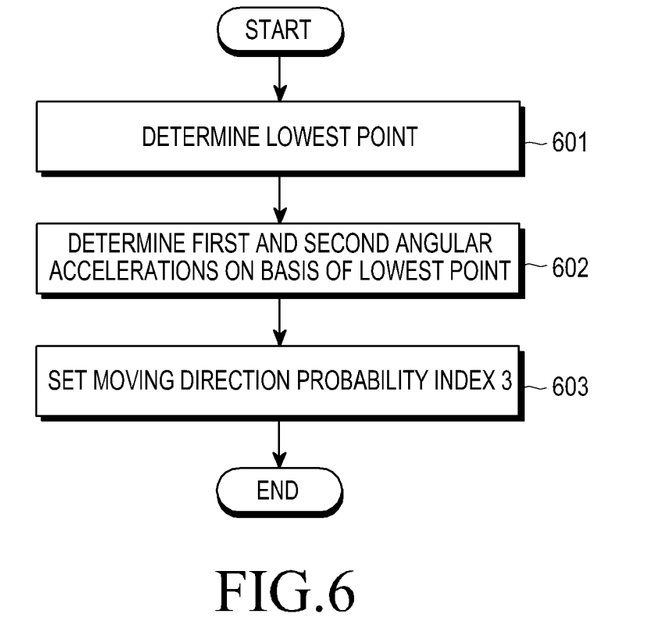
FIG. 6 is a flow chart illustrating a method for determining a third moving direction probability index of a mobile terminal according to an embodiment of the present invention.

FIG. 6 is a flow chart illustrating a method for determining a third moving direction probability index of a mobile terminal according to an embodiment of the present invention. For example, FIG. 6 illustrates a detailed process performed in step 304 of FIG. 3.

Referring to FIG. 6, the location information estimator 103 determines the lowest point of the mobile terminal being swung by the user's arm by determining the value (e.g., a gyro sensor value) provided from the motion sensor 102, in step 601.

An angular acceleration given when the mobile terminal being swung by the user's arm rotates in the first direction corresponding to the user's moving direction starting from the lowest point of the mobile terminal, is greater than an angular acceleration given when the mobile terminal rotates in the second direction corresponding to the opposite direction of the user's moving direction starting from the lowest point. Therefore, in step 602, the location information estimator 103 determines an angular acceleration during a swing in the first direction and an angular acceleration during a swing in the second direction.

In step 603, the location information estimator 103 determines the direction having a greater angular acceleration as a user's moving direction, and sets the third moving direction probability index based on a difference between the angular acceleration during a swing in the first direction and the angular acceleration during a swing in the second direction. For example, the third moving direction probability index may be set using Equation (2) described above.

Figure 7:
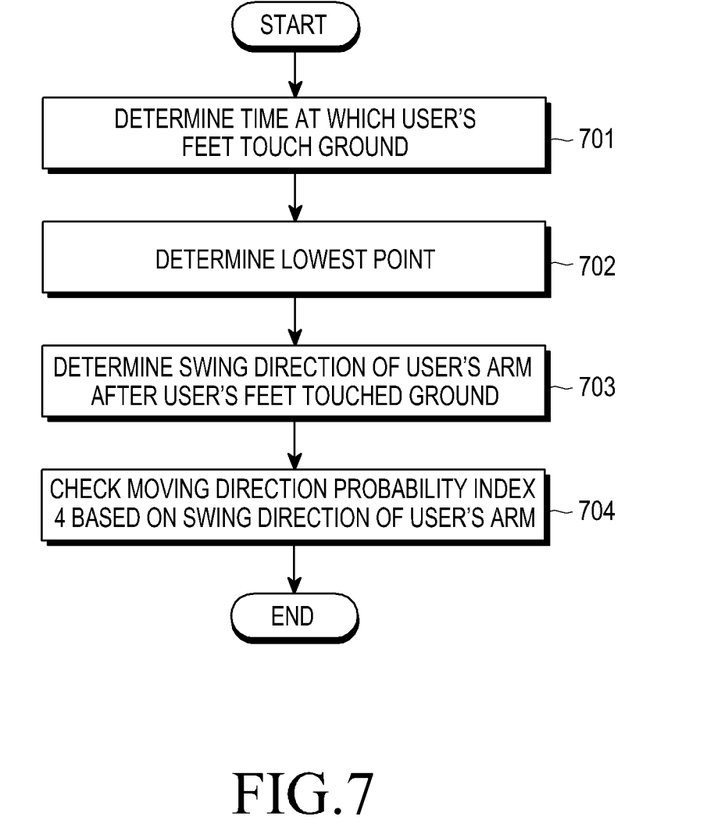
FIG. 7 is a flow chart illustrating a method for determining a fourth moving direction probability index of a mobile terminal according to an embodiment of the present invention.

FIG. 7 is a flow chart illustrating a method for determining a fourth moving direction probability index of a mobile terminal according to an embodiment of the present invention. For example, FIG. 7 illustrates a detailed process performed in step 305 of FIG. 3.

Generally, the mobile terminal passes its lowest point after the user's feet have touched the ground. Therefore, the location information estimator 103 may determine the time at which the user's feet touch the ground, based on the value provided from the motion sensor 102, and may determine a moving direction of the mobile terminal based on the angular speed given after the mobile terminal passed its lowest point after the time at which the user's feet have touched the ground.

Referring to FIG. 7, the location information estimator 103 determines the time at which the user's feet touch the ground by checking the value provided from the motion sensor 102 in step 701. For example, the location information estimator 103 may determine the time at which the user's feet touch the ground by repeatedly detecting the periodic movement of the mobile terminal in the gravity direction and its opposite direction.

In step 702, the location information estimator 103 determines the lowest point of the mobile terminal being swung by the user's arm by determining the value (e.g., a gyro sensor value) provided from the motion sensor 102.

In step 703, the location information estimator 103 determines a swing direction of the user's arm after the user's feet have touched the ground. That is, after the user's feet have touched the ground, the location information estimator 103 determines whether the mobile terminal moves in the first direction corresponding to the user's moving direction or in the second direction corresponding to the opposite direction of the user's moving direction on the basis of the its lowest point.

In step 704, the location information estimator 103 determines the fourth moving direction probability index based on the swing direction of the user's arm determined in step 703. For example, the fourth moving direction probability index may be determined using Equation (3) described above.

As is apparent from the foregoing description, the above-described embodiments of the present invention for estimating the displacement of the mobile terminal accurately estimate a user's stride and moving speed regardless of where on user's body the mobile terminal is carried.

Further, the above-described embodiments of the present invention accurately estimate a moving direction of the mobile terminal being swung by a user's arm.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for estimating displacement of a user terminal, the method comprising:
   estimating, by the user terminal, a moving state of the user terminal;
   determining a first moving direction probability index of a user, based on the estimated moving state of the user terminal; and
   determining the moving state of the user terminal and estimating a moving direction of the user terminal, based on the first moving direction probability index,
   wherein the first moving direction probability index is a predetermined value, which is used for determining a facing direction in which the display side of the user terminal is directed and for determining the moving direction in which the user terminal is moved.

2. The method of claim 1, wherein determining the moving state of the user terminal comprises:
   comparing averages of x, y, and z-axis output values provided from the motion sensor; and
   determining the moving state including directions of an upper portion and a display of the user terminal,
   wherein the x-axis is a longitudinal axis of the user terminal, the y-axis is a transverse axis of the user terminal, which is perpendicular to the longitudinal axis, and the z-axis is an axis that is perpendicular to a plane formed by the x-axis and the y-axis.

3. The method of claim 1, further comprising:
   determining a lowest point of the user terminal being moved by a swing of a user's arm;
   determining first and second angles of the user's arm swinging in first and second directions, respectively, based on the lowest point; and
   determining a second moving direction probability index of the user, based on the first and second angles.

4. The method of claim 3, wherein determining the second moving direction probability index of the user comprises estimating, as a user's moving direction, a direction corresponding to a greatest of the first and second angles.

5. The method of claim 4, further comprising setting the second moving direction probability index of the user, based on a difference between the first and second angles.

6. The method of claim 3, further comprising:
   determining first and second angular accelerations of the user's arm swinging in the first and second directions, respectively, based on the lowest point; and
   determining a third moving direction probability index of the user, based on the first and second angular accelerations.

7. The method of claim 6, wherein determining the third moving direction probability index comprises estimating, as a user's moving direction, a direction corresponding to one of the first and second angular accelerations, which is greatest.

8. The method of claim 7, further comprising setting the third moving direction probability index of the user based on a difference between the first and second angular accelerations.

9. The method of claim 6, further comprising:
   determining a time at which a user's feet touch ground;
   determining a swing direction of the user's arm, based on the lowest point after the user's feet have touched the ground; and
   determining a fourth moving direction probability index of the user, based on swing direction of the user's arm.

10. The method of claim 9, further comprising determining the moving state of the user terminal based on at least one of the first to fourth moving direction probability indexes.

11. The method of claim 9, wherein determining the moving state of the user terminal comprises:
    summing at least two of the first to fourth moving direction probability indexes; and
    determining a moving state of the user terminal taking, based on the summed at least two of the first to fourth moving direction probability indexes.

12. The method of claim 1, further comprising:
    determining a lowest point of the user terminal being moved by a swing of a user's arm;
    determining first and second angular accelerations of the user's arm swinging in first and second directions, respectively, based on the lowest point; and
    determining a third moving direction probability index of the user, based on the first and second angular accelerations.

13. An apparatus for estimating displacement of a user terminal, the apparatus comprising:
    a motion sensor that generates motion information representing a motion of the user terminal;
    a location information estimator that estimates a moving state of the user terminal being moved by a user, based on the motion information provided from the motion sensor, determines a first moving direction probability index of the user, based on the estimated moving state of the user terminal, estimates location information including a user's moving direction, based on the first moving direction probability index of the user, and determines the moving state of the user terminal, based on the first moving direction probability index of the user, wherein the first moving direction probability index is a predetermined value, which is used for determining a facing direction in which the display side of the user terminal is directed and for determining the moving direction in which the user terminal is moved.

14. The apparatus of claim 13, wherein the location information estimator determines the moving state of the user terminal by comparing averages of x, y, and z-axis output values provided from the motion sensor and determines the moving state including directions of an upper portion and a display of the user terminal,
    wherein the x-axis is a longitudinal axis of the user terminal, the y-axis is a transverse axis of the user terminal, which is perpendicular to the longitudinal axis, and the z-axis is an axis that is perpendicular to a plane formed by the x-axis and the y-axis.

15. The apparatus of claim 13, wherein the location information estimator determines a lowest point of the user terminal being moved by a swing of a user's arm, based on the motion information provided from the motion sensor, determines first and second angles of the user's arm swinging in first and second directions, respectively, based on the lowest point, and determines a second moving direction probability index of the user, based on the first and second angles.

16. The apparatus of claim 15, wherein the location information estimator determines first and second angular accelerations of the user's arm swinging in the first and second directions, respectively, based on the lowest point, and determines a third moving direction probability index of the user, based on the first and second angular accelerations.

17. The apparatus of claim 16, wherein the location information estimator determines a swing direction of the user's arm after user's feet have touched ground, based on the motion information provided from the motion sensor, and determines a fourth moving direction probability index of the user, based on the swing direction of the user's arm after user's feet have the touched ground.

18. The apparatus of claim 17, wherein the location information estimator determines the moving state of the user terminal, based on at least one of the first to fourth moving direction probability indexes.

19. The apparatus of claim 17, wherein the location information estimator sums at least two of the first to fourth moving direction probability indexes, and determines the moving state of the user terminal, based on the summed at least two of the first to fourth moving direction probability indexes.

20. The apparatus of claim 13, wherein the location information estimator determines a lowest point of the user terminal being moved by a swing of a user's arm, based on the motion information provided from the motion sensor, determines first and second angular accelerations of the user's arm swinging in first and second directions, respectively, based on the lowest point, and determines a third moving direction probability index of the user, based on the first and second angular accelerations.

\* \* \* \* \*